May 31, 1960    P. S. RAND    2,938,666
RECORD SENSING MEANS
Filed Oct. 7, 1955    4 Sheets-Sheet 1

INVENTOR
PHILIP S. RAND
BY *J. L. Sterling*
ATTORNEY

May 31, 1960  P. S. RAND  2,938,666
RECORD SENSING MEANS
Filed Oct. 7, 1955  4 Sheets-Sheet 2

INVENTOR
PHILIP S. RAND

BY *JL L Sterling*

ATTORNEY

May 31, 1960
P. S. RAND
2,938,666
RECORD SENSING MEANS
Filed Oct. 7, 1955
4 Sheets-Sheet 3
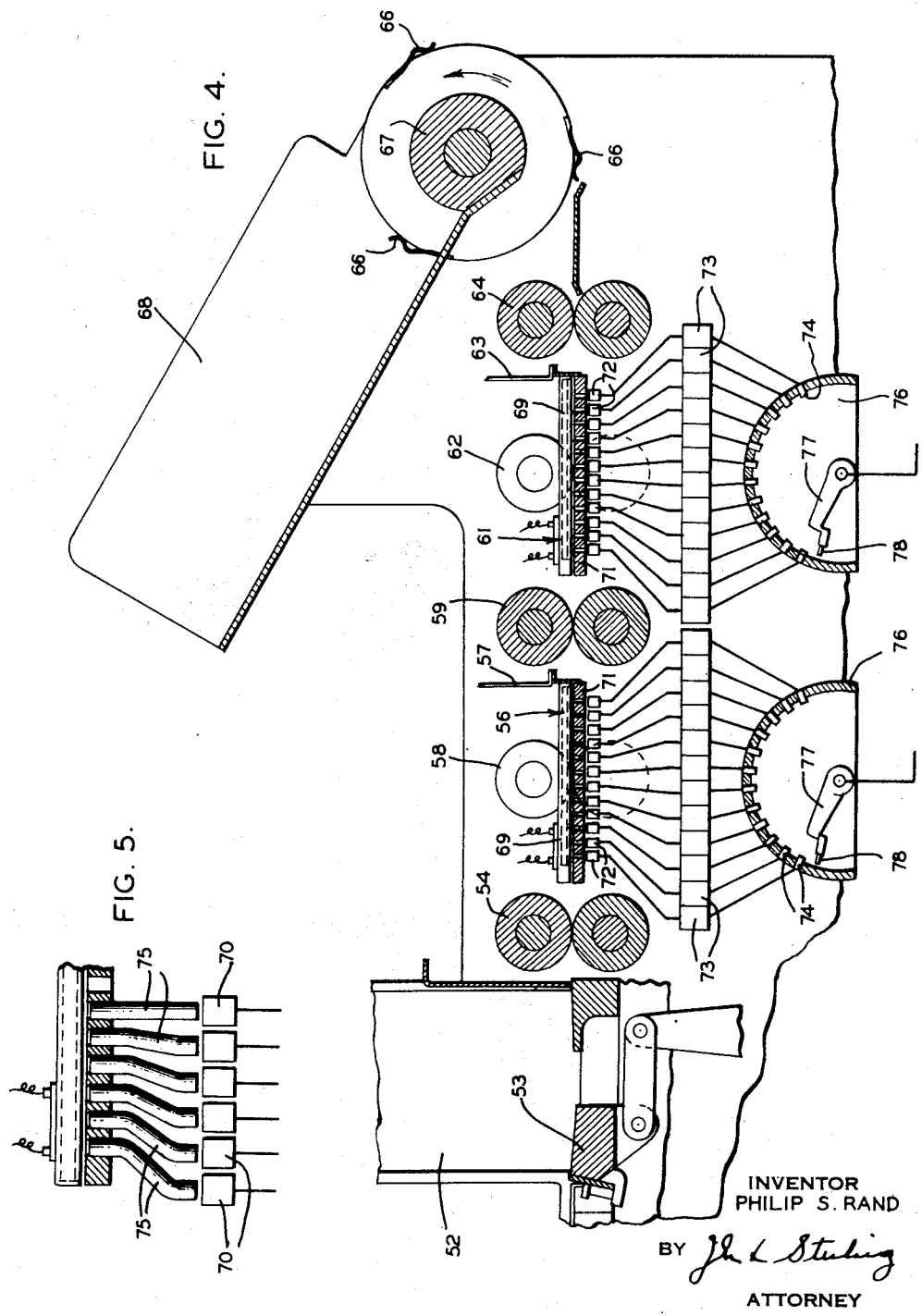
INVENTOR
PHILIP S. RAND
BY
ATTORNEY May 31, 1960  P. S. RAND  2,938,666
RECORD SENSING MEANS
Filed Oct. 7, 1955  4 Sheets-Sheet 4
FIG. 6.
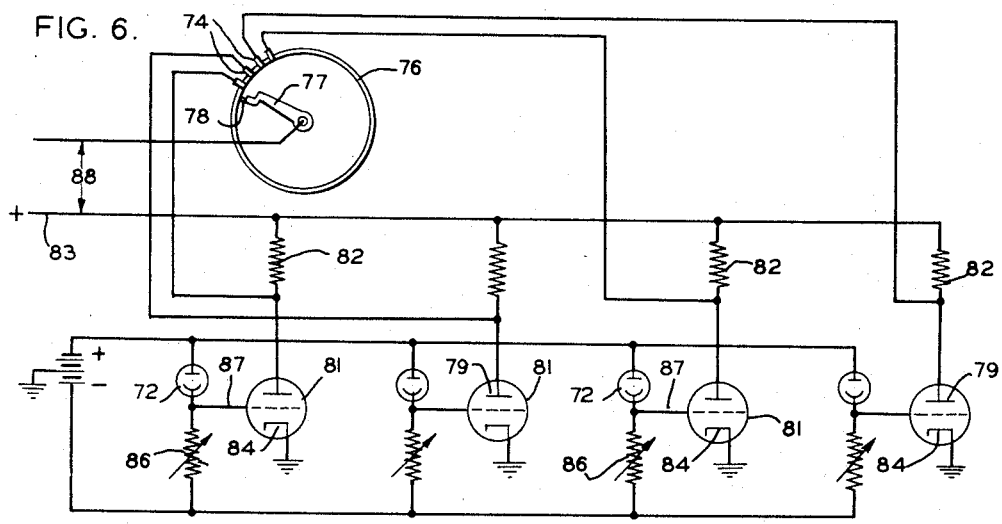
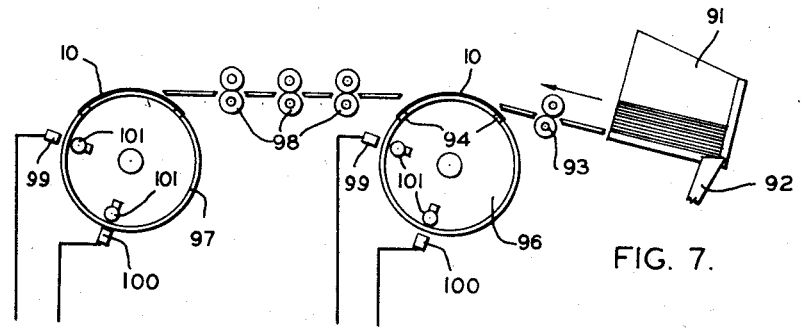
FIG. 7.
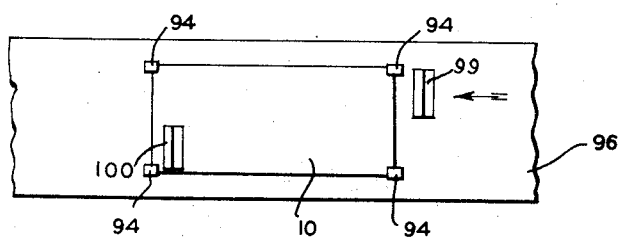
FIG. 8.
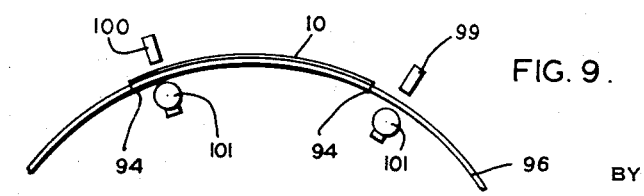
FIG. 9.
INVENTOR
PHILIP S. RAND
BY *John L. Sterling*
ATTORNEY

United States Patent Office 2,938,666
Patented May 31, 1960

2,938,666
RECORD SENSING MEANS

Philip S. Rand, Redding Ridge, Conn., assignor to Sperry Rand Corporation, New York, N.Y., a corporation of Delaware Filed Oct. 7, 1955, Ser. No. 539,103

12 Claims. (Cl. 235—61.11)

This invention relates to record sensing devices, and in particular to one adapted to read the data designations of a statistical card or the like.

In the use of mechanical pin sensing means or electrical contact brushes that physically engage the card, the latter is likely to become warm or mutilated with successive passages through the sensing means. In order to eliminate the possibility of wear from this source, it is an object of the invention to sense or read the data from a record card with means that do not physically engage the card so that the card will have a greater period of usefulness.

A further object of the invention is to provide record reading means that can be employed with a web or card form of thin paper or card stock that would be too fragile to withstand the repeated action of sensing means that wipe the stock as is the case with circuit controlling brushes, or pins that pass through the openings, which latter may become slightly mutilated, when the stock expands or contracts due to change in atmospheric conditions.

Still further objects of the invention are; to provide a reading means that has a minimum number of moving parts so that relatively quiet operation of the device is possible; to provide for reading the record by the operation of a scanning means that can read the record row by row; to provide for reading the record in its entirety at once; to provide for the use of rays from a light source that can be picked up and transmitted very rapidly and accurately; to provide a sensing device that may embody means for the control of remotely situated apparatus; and to provide a light sensing means that can be readily adjusted to read selected fields of a record.

The foregoing and other objects of the invention particularly relating to the details of construction and operation will become apparent from the following description read in conjunction with the accompanying drawing, in which Fig. 1 is a vertical section taken through a conventional card feeding mechanism from front to rear and in connection with which a preferred form of the invention is shown;

Fig. 4 is a view similar to Fig. 1 showing another means of employing the invention and illustrating its use in reading the entire record at once;

Fig. 5 is an enlarged sectional detail of a part of the sensing means of Fig. 4, showing an alternate construction;

Fig. 6 is a wiring diagram including some of the photocells and amplifying tubes in circuit with a commutator;

Fig. 7 is a schematic view of a sensing means including plural reading stations for use in devices requiring a presensing operation;

Fig. 8 is a fragmentary view of a drum on which a record card is carried in endwise position; and Fig. 9 is a sectional view of that portion of the drum shown in Fig. 8.

Figure 1:
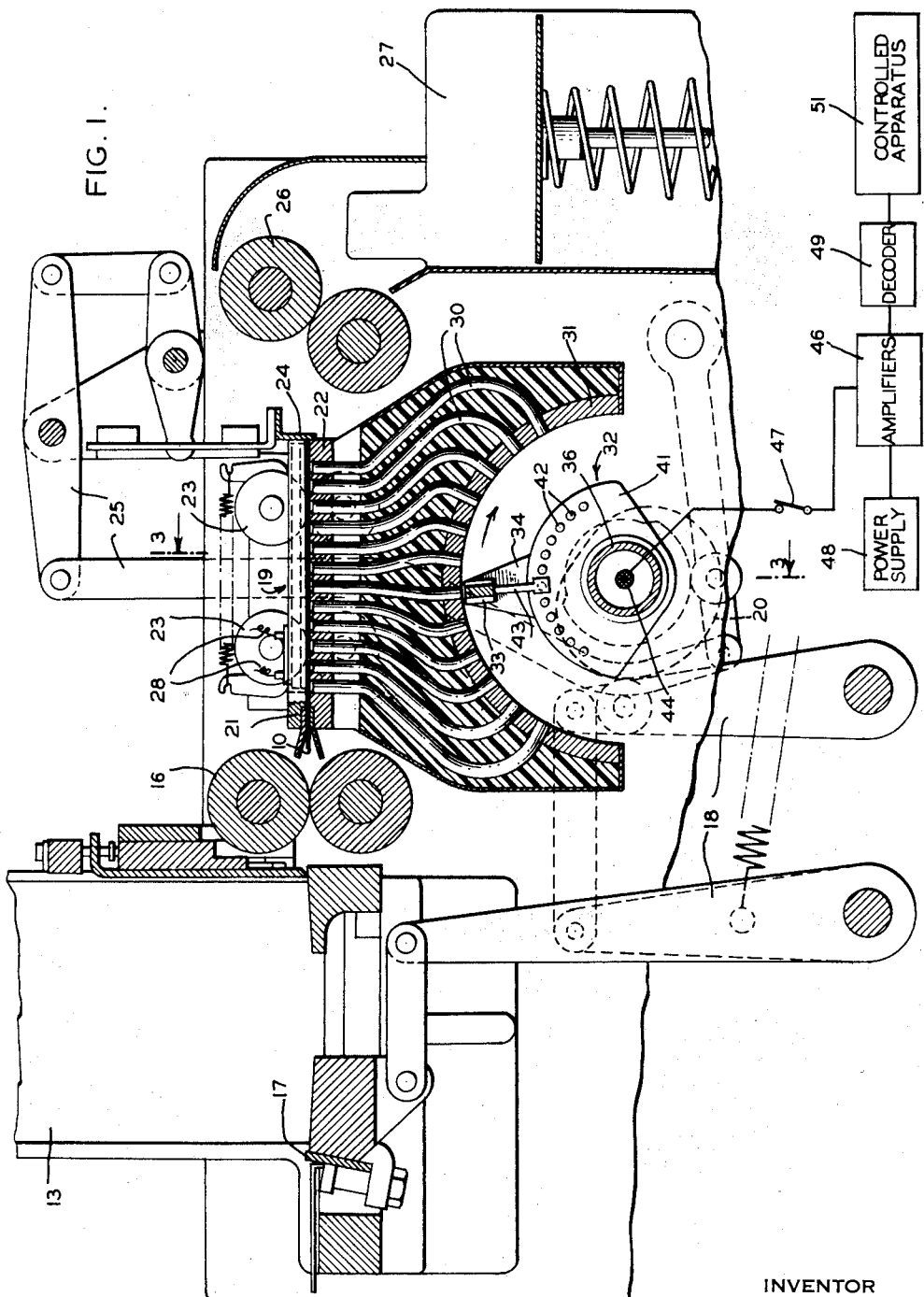
Figure 3:
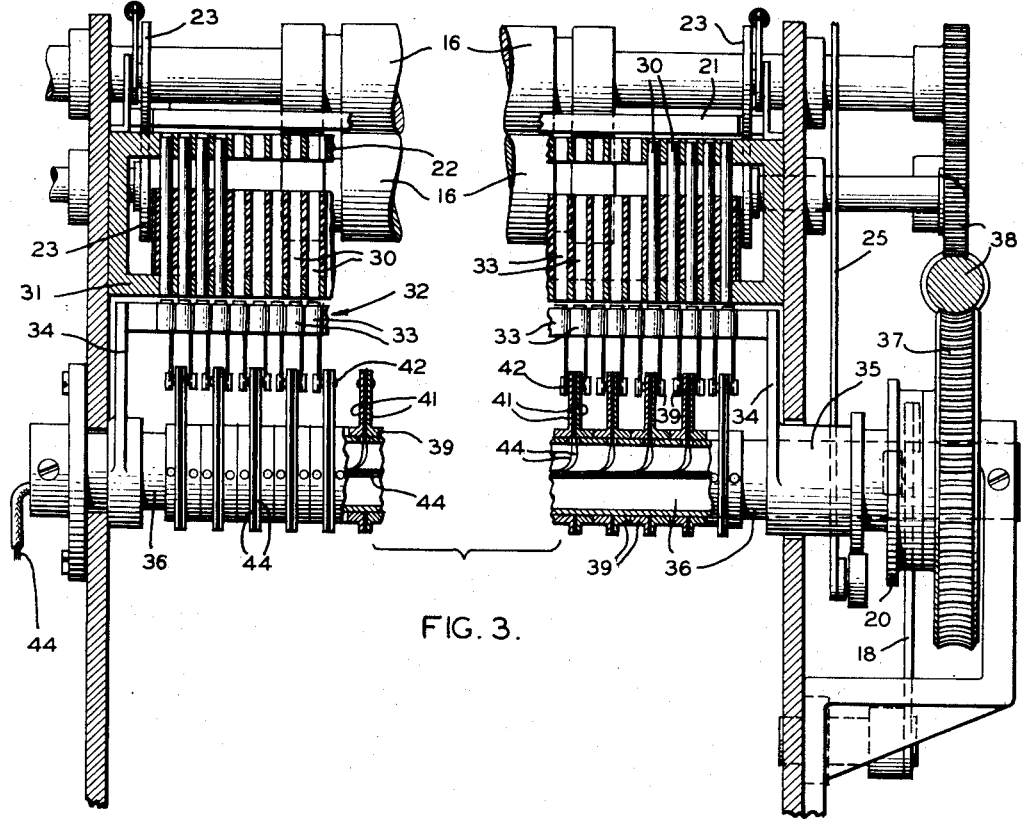
Fig. 3 is a vertical section taken substantially on the line 3—3 of Fig. 1, enlarged to show the detailed structure of the photocell mounting.
Figure 2:
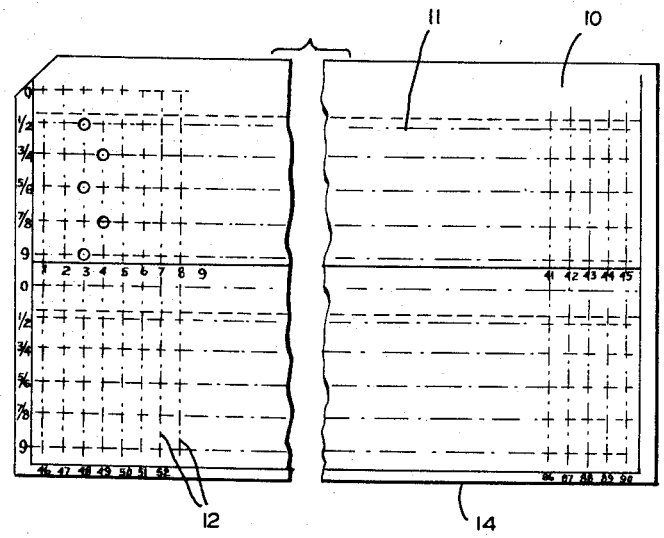
Fig. 2 is a face view of a statistical record card illustrating one form of record that can be sensed in the mechanism of Fig. 1.

Referring to the drawing in detail, and in particular to Figs. 1 to 3, inclusive, 10 indicates one form of a perforated record in the nature of a card which it is desired to sense. The data of the card is punched at any of five hundred and forty data designation positions located at the intersection of row and column positions to provide alphabetical and numerical information in code form. The rows 11 extend lengthwise of the card and the columns 12 extend widthwise thereof. The cards are stacked in a supply bin 13 with the bottom edges 14 thereof, constituting the leading edges, to be first fed out into the first feed rolls 16 by a picker knife 17 mounted on the upper end of a picker arm linkage 18. The latter is oscillated by a picker cam 20 to feed one card at a time out of the bin to be grasped by the first set of feed rolls 16 and to be fed to the sensing station 19.

The sensing station 19, as shown in Fig. 1 includes a card chamber consisting of an upper plate 21 and a lower plate 22 spaced vertically from each other to permit a card 10 to be slid therebetween by the combined action of the feed rolls 16 and spaced pairs of skid rolls 23 which are so disposed as to engage the end edges of the card to propel the latter through the sensing station and hold it by frictional engagement against a stop 24. The operation of the stop, through its linkage 25, is coordinated with the action of the picker as is well known and disclosed in Fig. 3 of Patent No. 2,323,816, granted to W. W. Lasker et al., July 6, 1943. When the card has been sensed, the stop 24 opens and the card is fed out of the sensing station by the combined action of the skid rolls 23 and a pair of eject rolls 26, and deposited in an output bin 27.

The upper plate 21 is of a suitable material that is electrically conductive and is coated with stannic oxide or other substance so that the plate glows when an electric current is applied thereto. Specifically a glass sheet, covered on its lower face with the coating, is supported in a frame to which wires 28 lead to provide current from any suitable source. The coated glass emits a glow which passes through the holes in the card 10 and which can be transmitted through suitable holes in the lower plate or masking panel 22 to the upper ends of the light conducting Lucite rods or tubes 30 which at their upper ends are supported in said panel. The latter constitutes a base plate along which the card is fed to abut the stop 24. The lower panel or masking plate is provided with an opening for each possible data designation position on a card or five hundred and forty holes in which are held the upper ends of a like number of light rods 30. The latter conduct the light, passing through all of the code openings in the card, to their lower extremities which are arranged in arcuate or cylindrical form to be swept by a detector unit indicated generally as at 32. The lower ends of the rods 30 are mounted in a suitable arcuate rod support 31 of metal or molded material secured in the frame of the machine and presenting an under recess in which the revolving detector unit is housed.

Each row of rods 30 contains forty-five elements. The pick-up or revolving member sweeps the ends of the elements or rods in row by row order and consists of forty-five photocells 33 mounted in a bail 34 which is pivoted at its opposite ends on a fixed hollow shaft 36. The bail has secured to a sleeve cam forming end 35 thereof worm gearing 37 which forms a part of a gear train 38 including suitable feed and skid roll operating gears for synchronizing the operation of the rolls and feed of the card with the operation of the scanning or detector unit 32. The bail revolves clockwise so that during approximately one half revolution the photocells 33 each scan columnwise the ends of the light rods 30 of each row. The light passing through a hole in the card in any data designation position thereof will energize a photocell 33 as it coincides with the end of the corresponding rod. The fixed tubular shaft 36 has secured thereto the flanged sleeves 39 of the commutator disks 41 which disks correspond with the photocells 33 and are made from a suitable insulating material. Each disk on its outer face is provided with studs or segments 42 corresponding to the data index positions of one column of the card, and also corresponding to the lower ends of the light rods 30 of each column. One commutator disk 41 is provided for each column of the record and as the cells 33 sweep the lower ends of the light rods 30, any cell energized by light will cause current to flow through a brush 43, depending therefrom for wiping engagement with the studs 42. Each stud is connected, through wiring 44, in circuit with a suitable current current amplifier 46, one form of which will be later explained. In each wire 44 a switch 47 is provided so that current, corresponding to holes in any field column of a record, can be transmitted to the amplifying means and in this manner the operator can select any of the columns in any field of the card that information is to be taken from. After the current passes through the amplifying means 46, which is connected to a power supply 48, it can be passed through a decoding means 49 and be used to control any desired apparatus 51 such as a punch, tabulator or typewriter, in the well known manner.

Referring to the form of the invention shown in Figs. 4, 5 and 6, a card supply bin or hopper 52 holds cards of the form shown in Fig. 2, which are fed out of the bottom of the bin by a picker 53 to be advanced by feed rolls 54 to a first sensing station 56 to abut an adjustable stop 57 against which the cards are held by skid rolls 58. At this station the cards are first sensed and when the stop 57 opens they are passed by intermediate feed rolls 59 to a second sensing station 61 which also includes skid rolls 62 and a stop 63 for holding the card to be sensed until such time in the sensing cycle as the stop is opened and the card then fed to the eject rolls 64. The cards issuing from the eject rolls are fed to the clips 66 of a stacking drum 67 which has a peripheral speed slightly less than the speed with which the card is advancing, so that the latter is forced into the clips and carried around on the drum to be deposited in an output bin 68. Both sensing stations 56 and 61 are of similar construction and a description of one will suffice. Each card chamber consists of an upper light source plate 69 of the nature described in connection with the structure of Fig. 1, that is, a plate having a coating on the underside which when subjected to an electric current will emit a glow, or any suitably illuminated glass plate which will provide downwardly directed light rays that can pass through the code holes of a card being sensed. The latter is supported on a masking plate 71 that has a hole in each position corresponding to the code designation positions of the card being sensed. Each of the five hundred and forty holes in the masking plate coincides with a photocell of a bank of photocells 72 closely underlying the masking plate which acts to prevent the spread of light from adjacent holes. The photocell bank is connected to suitable amplifying means 73 from which the current from each hole sensed in the card is transferred to the studs or segments 74 of a commutator 76. The latter is provided with a rotating arm 77 whose outer brush end 78 sweeps the inner periphery of the arcuate or cylindrical commutator to successively transfer the current from each row of segments, corresponding to the rows of data designation position of the card, to controlled equipment such as a punch or data comparing means for which the dual sensing stations may be employed, as an example of their use.

The commutator 76 has five hundred and forty segments 74 and forty-five brushes 78 representing the forty-five columns of the card. The commutator transmits the signals it receives to a suitable control panel, not shown, from whence they can be used to control a specific machine or function. In Fig. 6 a typical circuit for four photo-cells only is shown in which the anodes 79 of amplifier tubes 81 are connected through plate resistors 82 to a common current supply 83, the cathodes 84 being grounded. In the grid circuit of each tube 81 there is one photo-cell 72 connected in series with an adjustable resistor 86 and a grid voltage supply 87. The circuit is balanced by means of the individual grid resistors 86 so that no current flows through an amplifier tube from source 83 to ground when a photo-cell is not energized by the detection of light. If light shines on a photo-cell, the grid of the corresponding amplifier tube becomes positive and current then flows through the amplifier tube. The current produces a voltage drop across the corresponding anode resistor and since this resistor is connected to a commutator segment a voltage will appear across 88 when the brush 78 of the commutator wipes the segment. The time period in the scanning cycle when this voltage occurs indicates the particular code hole thereby sensed. As a modification of this arrangement it is possible to mount the photocells 70 in a larger area and use Lucite or quartz rods 75 to conduct light thereto from a masking plate as shown in Fig. 5. Also, in the forms illustrated, the light source may be an electrically conductive coated glass plate emitting infra red rays and the light cells can be lead sulphide cells which are sensitive to infra red rays.

In the form of the invention shown in Figs. 7, 8, and 9, a card hopper 91 and its associated picker feed means 92 passes cards endwise through feed rolls 93 to be inserted and held in suitable clips 94 on the surface of sensing drums 96 and 97 constituting first and second sensing stations between which the cards are advanced by the feed rolls 98. Each drum at spaced points on its periphery has two banks 99 and 100 of photo-cells. Each bank has six photo-cells for alignment with the upper and lower zone rows of the card as shown in Fig. 8. As the drum rotates the bank 99 will sense the holes in each successive column of the upper zone of the card and then bank 100 of the cells will sense the holes in each successive column of the lower zone of the card, the sensing in each instance occurring as the column of the card passes over the light source 101 one of which is mounted stationary inside the drum in alignment with each zone of the card. The drum may be of any desired material and the area thereof that supports the card may be perforated to provide a masking area or may be translucent to allow the light from the sources 101 to successively energize the photo-cells through the data designating holes in the card. The coordinated feed of the card and the position thereof with respect to the drum may be synchronized with the passage of a brush over the segments of a commutator, as shown in Figs. 1 and 4 and well understood in the art.

It is evident that any number of sets of photo-cell banks may be employed with one drum depending upon the size thereof so that more than one sensing of each card can take place on each drum. The use of the term "light" herein is intended to cover the various forms of energy wave lengths, infra red rays being one example.

While there has been shown and described the fundamentally novel features of the invention as embodied in several modifications, it will be understood that various omissions and changes in the forms and details of the device illustrated and in its operation may be made by those skilled in the art without departing from the spirit of the invention. It is the intention therefore to be limited only as indicated by the scope of the following claims.

What is claimed is:

1. In a machine controlled by a record having data index positions arranged in column and row order thereon; spaced plate members constituting a record chamber, an upper one of said plate members providing a source of light and a lower one of said plate members having openings therein corresponding with each of the data index positions of the record; means for feeding a record to and from said chamber; stop means for arresting the record in the chamber with the data index positions in register with the openings of said lower plate member; light conveying means extending from said openings, cell means arranged for sweeping relation with said light conveying means and adapted to be energized by light passing from the upper plate, through data openings in the record and through corresponding openings in the lower plate; and circuit means including said light cell means and apparatus to be controlled in accordance with the energization of said light cell means.

2. In a machine controlled by a record having data index positions arranged in column and row order thereon; spaced plate members constituting a record chamber, the upper plate member providing a source of light and the lower plate member having openings corresponding with each of the data index positions of the record; means for feeding a record to and from said chamber; stop means for arresting the record in the chamber with the data index positions thereof in register with the corresponding openings in said lower plate member; light conveying rod means dependinng from the openings in said second plate; light energizable means for sweeping the lower end of said rod means; and circuit means including apparatus to be controlled by the energization of said sweeping means by light passing through data openings in the record.

3. In a machine controlled by records having data index positions arranged in column and row order thereon; upper and lower plate members constituting a record chamber, the upper light plate providing a source of light and the lower masking plate having an opening corresponding to each data index position of the record; means for feeding records successively through the record chamber; means for arresting each record in the chamber with the index positions thereof in register with the openings in the masking plate; rod means extending from each opening in said masking plate and adapted to be illuminated by light passing from said light plate through data openings in certain index positions of said record; photocell means arranged for sweeping relation with said rod means and adapted to be energized by the light detected in said rod means; and circuit means including said photocell means for controlling the operation of apparatus by the energization of said cell means.

4. In a machine controlled by record cards having data index positions arranged in column and row order thereon; a light source plate and a light masking plate spaced from each other and constituting a card chamber, the masking plate having an opening corresponding to each data index position of a card; means for feeding the cards one at a time through the card chamber; means for arresting each card in the chamber with the index positions thereof in register with the openings in the masking plate; light conveying rod means extending from the openings in said masking plate and having the terminals thereof arranged in semi-cylindrical form; light energizable means for sweeping the terminals of said rod means; and circuit means including said light energizable means for controlling the operation of apparatus by light passing through data openings in the card.

5. In a machine controlled by record cards having data index positions arranged in column and row order thereon; a light source plate and a light masking plate spaced from each other and constituting a card chamber, the masking plate having an opening corresponding to each data index position of a card; means for feeding the cards one at a time through the card chamber; means for arresting each card in the chamber with the index positions thereof in register with the openings in the masking plate; light conveying rod means extending from the openings in said masking plate and having the terminals thereof arranged in semi-cylindrical form; light energizable means for successively sweeping the terminals of said rod means in row by row order; and circuit means including said light energizable means for controlling the operation of apparatus by light passing through data openings in the cards.

6. In a machine controlled by record cards having data index perforation positions arranged in column and row order thereon; a light source means for passing light through perforations at said positions, a light masking means spaced from said source means to provide a card chamber therebetween, the masking means having an opening corresponding to each data index position of a card; means for feeding the cards one at a time through said card chamber; means for stopping each card in the chamber with the index positions thereof in register with the openings in the masking means; light conveying means extending from the openings in said masking means and terminating at their lower ends in cylindrical form; a unit for detecting light in each of said conveying means including a movable bail; a photocell in the bail for scanning the lower end of each light conveying means in columnwise order; means for actuating said bail; fixed commutator means, brush means extending from each photocell for wiping said commutator means; and circuit means including said commutator, photocell and brush means for controlling operation of an apparatus by the energization of said cell means.

7. In a device of the character described, the combination with record feeding mechanism of; means for passing light through all of the data openings in the record; means for transferring said light; a row of photocell means energized by the light passing through said data openings and transfer means and adapted to sweep said transfer means in row by row order; commutator means to which the energy of said photocell means is transferred in columnwise order; and circuit means governed by said commutator means for controlling the operation of apparatus in accordance with the passage of light through the data openings in the record.

8. The invention as set forth in claim 6 in which the means for passing light through the data openings of the record includes a glass plate and a coating on said plate for emitting infra red rays when the plate is rendered electrically conductive.

9. The invention as set forth in claim 6 in which the means for passing light through the data openings of the record includes a panel member having a luminescent surface facing said record.

10. The invention as set forth in claim 6 in which said photocell means includes a single row of cells adapted to be energized by light, and means for moving the row of cells past said data openings in columnwise direction.

11. The invention as set forth in claim 6 in which said commutator means includes a plurality of disks each having spaced contacts thereon corresponding to the data opening positions in one column of a record; contact means extending from each photocell means to the corresponding disk contacts; and an apparatus controlling circuit including said photocell means and said contacts.

12. In a machine controlled by a record card having data index positions arranged in column and row order thereon; a sensing station; means for feeding the card through said sensing station; light conveying means at said station for passing light from the data openings of said card; photocell means arranged for sweeping relation with said conveying means and energized by the light passing through said openings and conveying means; and circuit means, governed by said photocell means, for controlling the operation of said machine.

References Cited in the file of this patent
UNITED STATES PATENTS

| | | |
|---|---|---|
| 2,651,461 | Luhn | Sept. 8, 1953 |
| 2,672,288 | Perrin | Mar. 16, 1954 |